United States Patent [19]

Wilkin

[11] 3,846,023
[45] Nov. 5, 1974

[54] RANGE RETICLE IN A NIGHT VISION DEVICE

[75] Inventor: Michael J. Wilkin, West Long Branch, N.J.

[73] Assignee: The United States of America as represented by the Secretary of the Army, Washington, D.C.

[22] Filed: Mar. 5, 1973

[21] Appl. No.: 337,795

[52] U.S. Cl................. 356/21, 240/7.7, 350/10
[51] Int. Cl........................ G01c 3/00, G01c 3/16
[58] Field of Search.......... 350/2, 99, 10; 356/3, 21, 356/121, 142; 340/25, 27 NA; 240/7.7

[56] References Cited
UNITED STATES PATENTS

| | | | |
|---|---|---|---|
| 2,423,718 | 7/1947 | Morrison | 356/21 |
| 2,555,807 | 6/1951 | Morris | 240/7.7 |
| 3,407,302 | 10/1968 | Boumers | 350/2 |
| 3,710,311 | 1/1973 | Avital | 240/7.7 |

Primary Examiner—John K. Corbin
Assistant Examiner—F. L. Evans
Attorney, Agent, or Firm—Herbert Berl; Edward J. Kelly; T. Major

[57] ABSTRACT

By viewing the invariant diametric dimension of the light path generated by a pair of lights located on the tips of a helicopter's rotor blades through an optical device having appropriate reticle markings thereon, a pilot in another helicopter can maintain his position at a desired distance relative to the first helicopter.

6 Claims, 4 Drawing Figures

PATENTED NOV 5 1974  3,846,023

| | SEPARATION |
|---|---|
| | 100 FEET |
| | 150 FEET |
| | 200 FEET |
| | 300 FEET |
| | 400 FEET |
| | 800 FEET |

RANGE RETICLE IN A NIGHT VISION DEVICE

The invention described herein may be manufactured, used, and licensed by or for the Government for governmental purposes without the payment to me of any royalty thereon.

BACKGROUND OF THE INVENTION

The ability of a number of helicopters to accurately maintain a desired positional relationship in flight under adverse visibility conditions is of prime importance in flight safety. The solution to the problem is largely dependent upon having reasonably accurate range information.

The technique of stadia range finding is the basis of this invention. Stadia range finding devices relate established reticle spacing in a viewing device to a known dimension of an object to determine its range.

SUMMARY OF THE INVENTION

The unique feature of the instant system and technique is the invariance of the object dimension regardless of the angle from which it is viewed when distance is held constant. This aspect of the invention is deemed to be a distinct and novel feature over prior devices.

The technique derives from the characteristic of a circle whereby the diametric dimension remains a constant at a fixed distance therefrom regardless of the position of a viewer relative to the plane of the circle. For example, the invariant dimension will be a diameter, a major axis of an ellipse or simply a line which is the projection of the circumference of a circle, accordingly, as the circle is viewed from a position normal to, obliquely to, or in its plane.

In one embodiment of the disclosed invention, the pattern is generated by the tip lights located on the rotating helicopter rotor blades; while the reticle used is located in the optical system of image intensifying night vision goggles.

DESCRIPTION OF THE PREFERRED EMBODIMENTS

Figure 1:
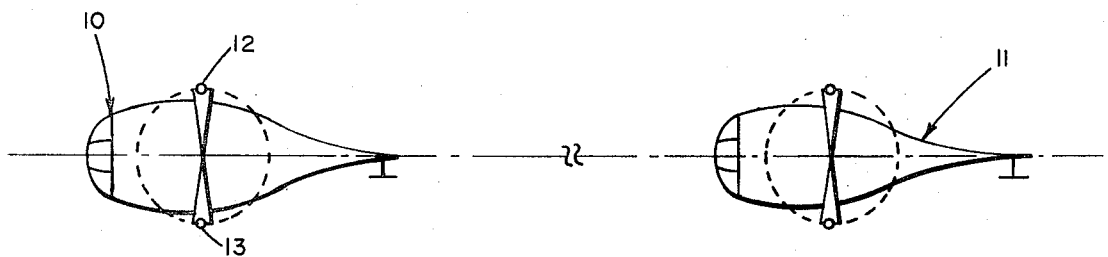
FIG. 1 shows a pair of helicopters in formation flight.
Figure 2:
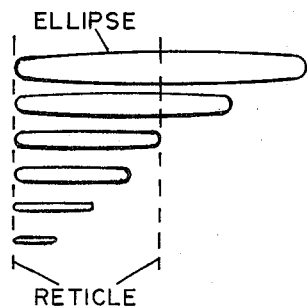
FIG. 2 shows the relation between the light ellipse and the reticle as a following pilot would see it in a typical formation flight situation.

Referring to FIG. 1 we see a plan view of a pair of helicopters 10 and 11 in formation flight. The lead helicopter is shown having a pair of lights 12 and 13 located on the rotor blade tips. As the blades rotate, the viewer sees the light path generated as a result of retinal image rentention. In general, the second helicopter 11 will be flying behind and above the lead helicopter 10. Since standard night formation flight separation between aircraft is 200 feet, representing a subtended angle of approximately 12° 33' for a 44 foot rotor blade, a logical choice for a simple reticle would be two reticle marks 12° 33' apart focused at infinity. What the pilot of the second helcipoter 11 sees can best be explained with reference to FIG. 2 which shows the relation between reticle markings and the major axis dimensions of the elliptical light path at various distances between the pilot in helicopter 11 and the lead helicopter 10 of FIG. 1; using reticle spacing representing a 44 foot rotor diameter at a range of 200 feet. By studying FIG. 2, several visual effects become obvious. Halving the range doubles the width of the ellipse. Conversely, halving the size of the ellipse means doubling the range. What the user must so is to compare the ellipse to the 200 foot reticle marks. If the ellipse shrinks by 25 percent from its size at 200 feet then the separation has increased by 100 feet. If it increased by 25 percent over its 200 foot size then the separation has decreased by only 25 feet. The pilot utilizing the reticle must learn how to read the range. However, this acquired ability to precisely measure range at small separations is a significant safety advantage. Another advantage comes from the corresponding increase in ability to detect closure rates between the aircraft. For example, if the chase helicopter closes on the lead helicopter at a constant rate of 100 feet per minute, the ellipse will go from 25 percent of the 200 foot size (800 foot distance) to the 200 foot size in six minutes. It will then increase 100 percent in size (100 foot distance) in one minute. That is, to the chase pilot closing at a constant rate the ellipse will appear to grow faster and faster as he approaches the lead craft. If the pilot, however, keeps constant the rate at which the ellipse grows, his rate of closure will decrease as he approaches the lead aircraft. Such a feature would be useful in a rendezvous situation.

Figure 3:
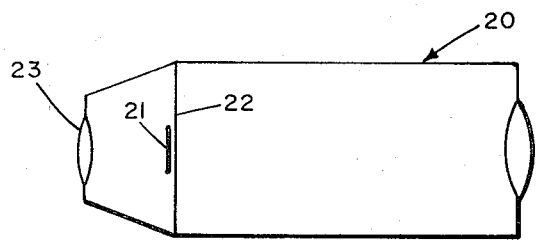
FIG. 3 diagrammatically shows night vision goggles having a reticle scribed therein.

FIG. 3, showing night vision goggles 20 diagrammatically, indicates the reticle marks 21 placed on the image intensifier screen 22. The eyepieces 23 permit the marks to be projected clearly in the user pilot's field of view.

Figure 4:
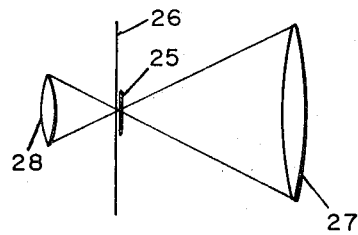
FIG. 4 shows a general arrangement by which a reticle is projected into the pilot's field of view.

Alternatively, as in FIG. 4, reticle markings 25 are placed in the pilot's field of view without the use of night vision goggles. This may be accomplished optically using a reticle element 26 located in the focal plane of an objective 27. The observer views the scene and appropriately spaced reticle marks through eyepiece 28 and, by maneuvering his craft, maintains the appropriate spacing between his craft and the craft he is following.

While only the above embodiments of the invention have been disclosed, it is to be understood that many variations, substitutions and alterations may be made while remaining within the spirit and scope of the invention which is limited only by the following claims.

I claim:
1. A ranging system for maintaining the spacing between helicopters, comprising:
   means associated with one of said helicopters for providing a rotatable incandescent lamp means positioned on the rotor tips of said helicopters for generating a circular light pattern thus providing an invariant diametric dimension from any viewing angle at a fixed distance therefrom; and
   optical means for viewing said pattern from a second helicopter, said optical means having reticle markings spaced apart a distance corresponding to said invariant dimension viewed at a predetermined distance, whereby, said spacing between helicopters is maintained when the invariant dimension matches the spacing of the reticle markings.

2. The system of claim 1 wherein said optical viewing means include night vision goggles having image intensification means therein and wherein said reticle markings are imaged in the field of view of said image intensification means.

3. The system of claim 2 wherein said reticle markings consist of spaced apart marks inscribed upon the viewing screen of said image intensification means.

4. The system of claim 1 wherein said optical viewing means consist of:
an objective lens;
means having said reticle markings thereon and positioned at the focus of said objective; and
eyepiece means optically aligned with said objective lens and said reticle markings whereby said reticle markings are viewed in the field of vision of an observer utilizing said optical means.

5. A method of maintaining a predetermined distance between two positions, the relative distance of which may be varied, comprising:
establishing a diametric dimension that is invariant with viewing angle by providing a circular light pattern at one of said positions;
providing reticle markings in an optical system at the other of said positions, said reticle markings being spaced apart a distance corresponding to the optical size of said diametric dimension of said predetermined distance;
comparing said diametric dimension with said reticle markings; and
varying the distance between said two positions until the optical size of said diametric dimension matches the spacing of said reticle markings.

6. A method of maintaining a predetermined spacing between helicopters in flight comprising the steps of:
generating a circular light pattern by spinning incandescent lamps positioned on the rotor blades of at least one of said helicopters thereby generating a diametric dimension that is invariant with viewing angle at any given range therefrom;
providing reticle markings in an optical system in at least the other of said helicopters, said reticle markings being spaced apart a distance corresponding to the optical size of said diametric dimension at said predetermined distance;
comparing said diametric dimension with said reticle markings; and
varying the distance between said helicopters until the optical size of said diametric dimension matches the spacing of said reticle markings.

* * * * *